United States Patent
Hodges

(10) Patent No.: US 9,495,151 B1
(45) Date of Patent: Nov. 15, 2016

(54) AUTOMATIC COMMENT CREATION FOR COMPUTER FILES

(71) Applicant: International Business Machines Corporation, Armonk, NY (US)

(72) Inventor: Ian M. Hodges, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/739,336

(22) Filed: Jun. 15, 2015

(51) Int. Cl.
*G06F 9/44* (2006.01)

(52) U.S. Cl.
CPC ........................ *G06F 8/73* (2013.01)

(58) Field of Classification Search
None
See application file for complete search history.

(56) References Cited

U.S. PATENT DOCUMENTS

| | | | | |
|---|---|---|---|---|
| 5,862,309 | A * | 1/1999 | Duniho | G06F 17/241 |
| | | | | 358/1.15 |
| 6,009,441 | A * | 12/1999 | Mathieu | G06F 17/21 |
| | | | | 707/E17.118 |
| 6,986,129 | B2 | 1/2006 | Arbouzov et al. | |
| 7,222,333 | B1 | 5/2007 | Mor et al. | |
| 7,305,629 | B2 * | 12/2007 | Barsness | G06F 8/73 |
| | | | | 715/788 |
| 8,607,193 | B2 * | 12/2013 | Avrahami | G06F 9/44 |
| | | | | 717/100 |
| 2004/0015843 | A1 * | 1/2004 | Quan, Jr. | G06F 8/427 |
| | | | | 717/110 |
| 2005/0050520 | A1 * | 3/2005 | Motoyama | G06F 8/30 |
| | | | | 717/123 |
| 2006/0020928 | A1 * | 1/2006 | Holloway | G06F 9/4448 |
| | | | | 717/136 |
| 2006/0277531 | A1 * | 12/2006 | Horwitz | G06F 8/75 |
| | | | | 717/137 |
| 2007/0250810 | A1 * | 10/2007 | Tittizer | G06F 8/73 |
| | | | | 717/110 |
| 2008/0189681 | A1 | 8/2008 | Bhogal et al. | |
| 2008/0228762 | A1 * | 9/2008 | Tittizer | G06F 8/73 |
| 2015/0347128 | A1 | 12/2015 | Frenkiel et al. | |

FOREIGN PATENT DOCUMENTS

JP 09222999 A 8/1997

OTHER PUBLICATIONS

"Inferring Semantically Related Words from Software Context". Yang et al., IEEE 2012.*
Hodges, "Automatic Comment Creation for Computer Files", U.S. Appl. No. 14/982,377, filed Dec. 29, 2015.
Appendix P—List of IBM Patents or Patent Applications Treated as Related, 2 Pages.
"Inserting copyright notice/banner in all source code files in Visual Studio 2012"; Printed Mar. 4, 2015; <http://stackoverflow.com/questions/12199409/inserting-copyright-notice . . . >.
U.S. Appl. No. 15/168,633, field May 31, 2016; Entitled "Automatic Comment Creation For Computers Files".
List of IBM Patents or Patent Applications Treated As Related; Dated May 31, 2016; 2 pages.

* cited by examiner

*Primary Examiner* — Daxin Wu
(74) *Attorney, Agent, or Firm* — David Richart

(57) ABSTRACT

Embodiments of the present invention include a method, computer program product, and system for inserting text content into a computer file as a comment in a determined comment convention. In an embodiment, a comment convention is determined in a file. The file includes at least one file line. A text content is received. A comment is inserted into the file. The comment includes the comment convention and the text content.

11 Claims, 3 Drawing Sheets

AUTOMATIC COMMENT CREATION FOR COMPUTER FILES

BACKGROUND

The present invention relates generally to the field of computer programming, and more particularly to techniques for inserting commentary text into computer files.

A comment is a computer programming language construct used to insert annotations into a computer code, in particular, the source code of a computer program. Comments are readable to programmers but are ignored by compilers and interpreters during execution of the program. Comments are inserted by programmers for a variety of reasons including to summarize a program or a particular section of code, to explain a programmer's intent, and to inform other programmers of who authored the program.

Each programming language has a specifically defined convention in which comments must be formatted. Comment conventions typically vary for each of the several languages, as well as for various file types even within the same language. Further, within each programming language there may be multiple variations, or styles, of comments that may be used by programmers. Comment conventions typically utilize one or more special characters at the beginning of a comment line, and comment conventions for some languages additionally utilize special characters at the end of a comment.

SUMMARY

Embodiments of the present invention include a method, computer program product, and system for inserting text content into a computer file as a comment in a determined comment convention. In an embodiment, a comment convention is determined in a file. The file includes at least one file line. A text content is received. A comment is inserted into the file. The comment includes the comment convention and the text content.

DETAILED DESCRIPTION

Embodiments of the present invention recognize the value of utilizing comments in computer files as a means for inserting text content. Embodiments of the present invention recognize that there exist a substantial number of unique comment conventions that vary among numerous computer programming languages and computer file types. Embodiments of the present invention recognize that current methods of inserting comments into computer files entail the time-consuming and laborious process of manually declaring, and updating, information such as file type and file content. Current approaches are time-consuming and laborious especially in instances where a comment needs to be inserted into numerous computer files of different programming languages and files types.

Embodiments of the present invention provide a program for inserting text content into a computer file as a comment without the computer file type or programming language being indicated to the program, declared in the program, or otherwise received by the program. The program determines a comment convention of a computer file, creates a comment in the determined comment convention, and inserts the created comment into the computer file.

Figure 1:
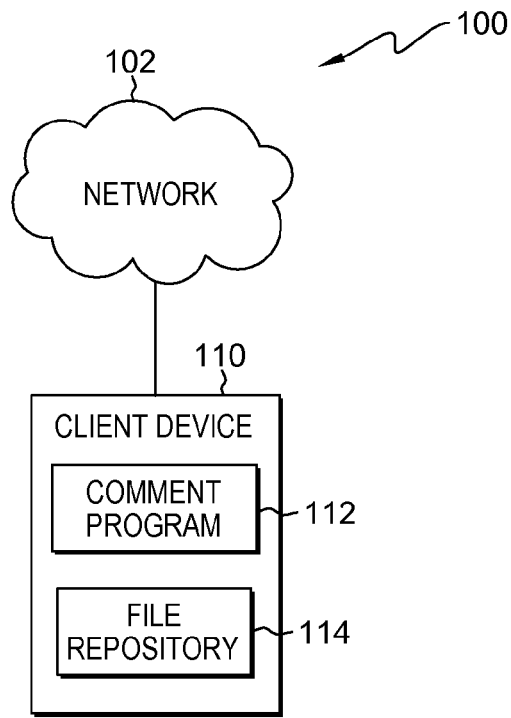
FIG. 1 is a functional block diagram of a distributed data processing environment, in accordance with an embodiment of the present invention.

The present invention will now be described in detail with reference to the Figures. FIG. 1 is a functional block diagram illustrating distributed data processing environment 100, in accordance with an embodiment of the present invention. FIG. 1 is for illustrative purposes and does not imply any limitations with regard to the environments in which embodiments of the present invention may be implemented.

In the illustrated embodiment, distributed data processing environment 100 includes client device 110. In general, client device 110 is any electronic device or combination of electronic devices capable of executing computer readable program instructions and communicating with any computing device within distributed data processing environment 100. For example, client device 110 may be a workstation, personal computer, laptop computer, tablet, personal digital assistant, or mobile phone. In various embodiments, client device 110 may be a computer system utilizing clustered computers and components (e.g., database server computers, application server computers) that act as a single pool of seamless resources when accessed by elements of distributed data processing environment 100, such as in a cloud computing environment. In the illustrated embodiment, client device 110 includes comment program 112 and file repository 114.

In various embodiments, client device 110 may access and communicate with other computers (not shown) through network 102. Network 102 may be a local area network (LAN), a telecommunications network, a wide area network (WAN) such as the Internet, or any combination of the three, and can include wired, wireless, or fiber optic connections. In general, network 102 may be any combination of connections and protocols supports communications between client device 110, comment program 112, file repository 114, and any other device connected to network 102, in accordance with embodiments of the present invention.

In an embodiment, comment program 112 may be a computer program, application, or subprogram of a larger program that accesses and communicates with file repository 114, in accordance with embodiments of the present invention. In an embodiment, comment program 112 may provide functions for utilizing files contained in file repository 114 such as searching for files, retrieving files, adding files, deleting files, reading files into an array, editing file content (e.g., adding or deleting information, modifying computer program code), and otherwise manipulating files and file content. In the illustrated embodiment, comment program 112 may directly access and communicate with file repository 114. In an alternative embodiment, comment program 112 may be located on another networked computer (not shown), and comment program 112 may indirectly access and communicate with file repository 114, located on client device 110, through network 102. In yet another embodiment, comment program 112 may access any computer file on another computer (not shown) connected to client device 110 through network 102. In yet another embodiment, comment program 112 may be integrated with another computer program (not shown) located on client device 110, for example as an add-on that enhances a code editing computer program.

In an embodiment, comment program 112 may be connected to one or more user interface devices to allow a user of client device 110 to manipulate files and otherwise utilize comment program 112. The term "user interface", as used herein, refers to the information, such as graphic, text, and sound, a program presents to a user and the control sequences the user employs to control the program. There are many types of user interfaces. For example, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in response to the perceived steep learning curve of command-line interfaces, which required commands to be typed on the keyboard. The actions in GUIs are often performed through direct manipulation of the graphical elements.

In an embodiment, file repository 114 contains one or more computer files for utilization by comment program 112, in accordance with an embodiment of the present invention. In general, a computer file is any volatile or non-volatile resource for storing information. In an embodiment, a file may contain text, image information, audio information, source code, or executable code, or a combination of the preceding. File repository 114 may be implemented using any volatile or non-volatile, computer-readable storage media known in the art. For example, file repository 114 may be implemented using a tape library, an optical library, one or more independent hard disk drives, or multiple hard disk drives in a redundant array of independent disks (RAID). Similarly, file repository 114 may be implemented using any suitable storage architecture known in the art, such as a relational database, an object-oriented database, one or more tables, or an array.

Figure 2:
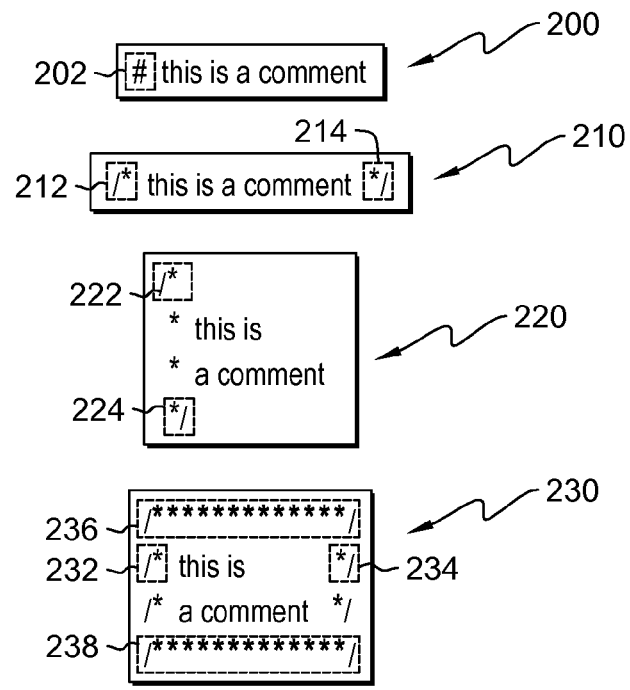
FIG. 2 is a diagram of typical comment conventions, in accordance with an embodiment of the present invention.

FIG. 2 is a diagram of comment A 200, comment B 210, comment C 220, and comment D 230, which illustrate typical comment conventions that may be used with certain computer programming languages. A comment is a computer programming language construct used to insert annotations into the source code of a computer program. Each computer programming language requires comments to be formatted in one or more specific, defined comment conventions. Comment conventions typically vary for each of the several programming languages. Comment B 210, comment C 220, and comment D 230 illustrate three different comment conventions that may be used within the same programming language. Comment A 200 illustrates a comment convention that may be altogether distinct from the comment convention of comment B 210, comment C 220, and comment D 230.

Comment conventions utilize sequences of special characters in various arrangements. A comment convention may utilize a start comment sequence at the beginning of a line containing a comment's text. For example, comment A 200 utilizes a single character, start comment sequence 202, as the start comment sequence. A comment convention may additionally utilize an end comment sequence at the end of a line containing a comment's text. An end comment sequence is typically the start comment sequence with the characters in reverse order. For example, comment B 210 utilizes end comment sequence 214 in addition to start comment sequence 212. A comment convention may utilize a header line and a trailer line instead of a start comment sequence and an end comment sequence. Header and trailer lines are sequences of characters that appear above and below the lines containing a comment's text. For example, comment C 220 utilizes header line 222 and trailer line 224. Finally, a comment convention may utilize header and trailer lines in addition to start and end comment sequences. For example, comment D 230 utilizes start comment sequence 232, end comment sequence 234, header line 236, and trailer line 238.

Figure 3:
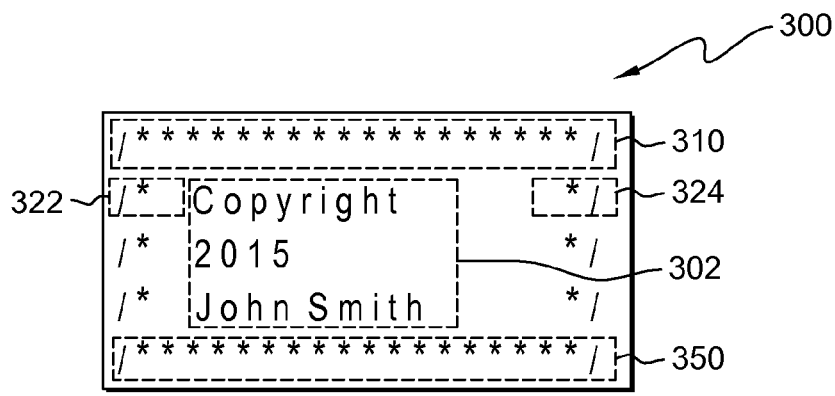
FIG. 3 is a diagram of an example comment, in accordance with an embodiment of the present invention.
Figure 4:
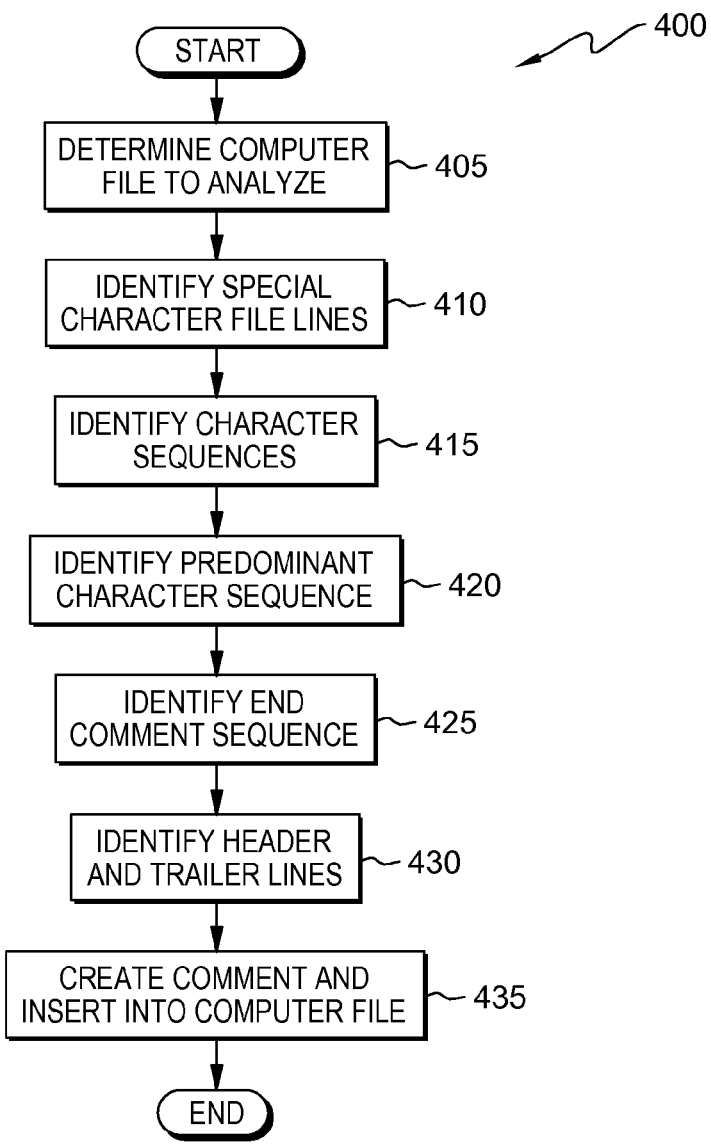
FIG. 4 is a flowchart illustrating operational steps for inserting text into a computer file as a comment without the computer file type or programming language being indicated to the program, in accordance with an embodiment of the present invention.

FIG. 3 is a diagram of example comment 300 illustrating a comment in a comment convention that comprises start comment sequence 322, end comment sequence 324, header line 310, trailer line 350, and text content 302, as discussed in greater detail in the description of workflow 400, depicted in FIG. 4. In the illustrated embodiment, example comment 300 comprises the first five lines of a computer program source code in a computer file.

FIG. 4 is a flowchart of workflow 400 illustrating operational steps for inserting text into a computer file as a comment without the computer file type or programming language being indicated to the program, declared in the program, or otherwise received by the program, in accordance with an embodiment of the present invention. The program determines the predominant comment convention of a computer file, creates a comment in the determined comment convention, and inserts the created comment into the file. In the illustrated embodiment, steps of the workflow are performed by comment program 112. In an alternative embodiment, steps of the workflow can be performed by any other computer program while working with comment program 112. In the illustrated embodiment, comment program 112 performs the operational steps for one computer file. In an alternative embodiment, comment program 112 may perform the operational steps for more than one computer file simultaneously.

Comment program 112 determines a computer file to analyze (step 405). In other words, comment program 112 receives an indication to analyze a computer file or a portion of a computer file. In an embodiment, a user, through a user interface of comment program 112 discussed previously, indicates to comment program 112 the computer file to analyze. In an alternative embodiment, the user additionally indicates to comment program 112 a text content to be inserted into the indicated file. For example, a user who authored a file content may provide text content 302, in example comment 300, in order to notify others of the file content's copyright protection. In an embodiment, comment program 112 may receive the computer file from file repository 114. In an embodiment, comment program 112 may read the file, or portion of a file, into an array, list, or other data structure to organize the file content for utilization by comment program 112.

Comment program 112 identifies special character file lines (step 410). In other words, comment program 112 identifies lines of the file that have a special character as the first non-space character in the line. In the illustrated embodiment, program 112 identifies the special character file lines by utilizing a parsing or sorting algorithm. In an embodiment, a special character is considered any character that is not a letter (i.e., a-z), number (i.e., 0-9), or a space. In an alternative embodiment, a special character may not include "{" or "}" since these characters may be commonly utilized in various programming languages for purposes other than comments. As an example, in example comment 300, each of the five file lines have the special character "!" as the first non-space character in the line, and comment program 112 identifies each line as having a special character as the first non-space character.

Comment program 112 identifies character sequences (step 415). In other words, comment program 112 identifies character sequences for each file line identified in step 410. In an embodiment, comment program 112 identifies character sequences that are of specified character lengths, starting from the first character in each line, where a space is considered a character. As an example, for the second file line in example comment 300 (i.e., "/* Copyright *!"), where comment program 112 receives an indication to identify the first 1-, 2-, 3-, 4-, and 7-character sequences of a line, where a space is considered a character, comment program 112 identifies the 1-character sequence as "/", the 2-character sequence as "/*", the 3-character sequence, start comment sequence 322, as "/*", the 4-character sequence as "/* C", and the 7-character sequence as "/* Copy". In an alternative embodiment, comment program 112 may identify character sequences of specified lengths, where a space is not considered a character. In an embodiment, a user, through the user interface of comment program 112 discussed previously, may indicate the lengths of the character sequences to be identified. In an alternative embodiment, the character sequence lengths may be defined in a computer program product implementing comment program 112.

Comment program 112 identifies a predominant character sequence (step 420). In other words, comment program 112 identifies a start comment sequence in the file. In the illustrated embodiment, the predominant character sequence, or start comment sequence, in the file is the character sequence that is identified most frequently in step 415. In an alternative embodiment, the start comment sequence is the character sequence that is identified most frequently in step 415 only if the character sequence meets an appearance requirement by being identified a specified number of times more often than any other character sequence. As an example, for a computer file where the most frequent character sequence "/*" is identified ten times and the second most frequent character sequence "//" is identified only four times, and where comment program 112 receives an indication for an appearance requirement of three, the character sequence "/*" meets the appearance requirement of three since it is identified six times more often than the second most frequent character sequence "//", and comment program 112 identifies the start comment sequence in the file as "/*". As another example, if the appearance requirement in the previous example is seven (instead of three), then the character sequence "/*" does not meet the appearance requirement of seven since it is identified only six times more often than the second most frequent character sequence "//", and comment program 112 does not identify the start comment sequence in the file as "/*". In an embodiment, a user, through the user interface of comment program 112 discussed previously, may indicate the appearance requirement. In an alternative embodiment, the appearance requirement may be defined in a computer program product implementing comment program 112.

Comment program 112 identifies an end comment sequence (step 425). In other words, comment program 112 determines whether the file's comment convention includes an end comment sequence. In an embodiment, comment program 112 may identify an end comment sequence by identifying the file's start comment sequence (identified in step 420) in reverse order in a file line in which the start comment sequence appears, starting from last character of the line. For example, for the second file line in example comment 300, where the start comment sequence is start comment sequence 322, comment program 112 identifies the start comment sequence in reverse order as end comment sequence 324, and comment program 112 identifies the end comment sequence as end comment sequence 324. As another example, for the line "# Copyright #", where the start comment sequence in the file is the single character "#", comment program 112 identifies the start comment sequence in reverse order as the sequence "#", and comment program 112 identifies the end comment sequence as the sequence "#". In an embodiment, comment program 112 may additionally identify the location, or column number, of the end comment sequence in the file line. For example, for the second file line in example comment 300, character sequence 324 corresponds to the nineteenth and twentieth characters in the line.

Comment program 112 identifies header and trailer lines (step 430). In other words, comment program 112 determines whether the file's comment convention includes header and trailer lines. In an embodiment, comment program 112 identifies a header line by comparing the first appearance of the start comment sequence in the file with the immediately preceding file line. If the first start comment sequence and the immediately preceding file line have a matching character in the same character location, or column, comment program 112 identifies the header line as the immediately preceding file line. For example, in example comment 300, where the start comment sequence in the file is start comment sequence 322, the first appearance of start comment sequence 322 is in the second file line, and the immediately preceding file line is the first file line, header line 310. The start comment sequence and the immediately preceding file line have a matching first character "!" as well as a matching second character "*", and comment program 112 identifies the header line as the immediately preceding file line, header line 310.

In an embodiment, comment program 112 identifies a trailer line by comparing the last appearance of the start comment sequence in the file with the immediately succeeding file line. If the last start comment sequence and the immediately succeeding file line have a matching character in the same character location, or column, comment program 112 identifies the trailer line as the immediately succeeding line. For example, in example comment 300, the last appearance of start comment sequence 322 is in the fourth file line, and the immediately succeeding file line is the fifth file line, trailer line 350. The start comment sequence and the immediately succeeding file line have a matching first character "!" as well as a matching second character "*", and comment program 112 identifies the trailer line as the immediately succeeding file line, trailer line 350.

Comment program 112 creates a comment and inserts the comment into the file (step 435). In an embodiment, comment program 112 creates a comment in the file's comment convention by utilizing the start comment sequence identified in step 420 (e.g., start comment sequence 322), the end comment sequence identified in step 425 (e.g., character sequence 324) or the header and trailer lines identified in step 430 (e.g., header line 310 and trailer line 350, respectively), if any are identified, and a text content indicated by a user in step 405 (e.g., text content 302). In an alternative embodiment, where a user does not provide a text content in step 405, comment program 112 may provide the created comment as a template, and the user through the user interface of comment program 112 discussed previously, may insert the text into the comment template. In an embodiment, a user, through the user interface of comment program 112 discussed previously, may indicate a location in the file where the comment is to be inserted. In an alternative embodiment, comment program 112 may insert the created comment into a file location that is defined in a computer program product implementing comment program 112. For example, comment program 112 may insert the comment into the first line of each indicated file.

Figure 5:
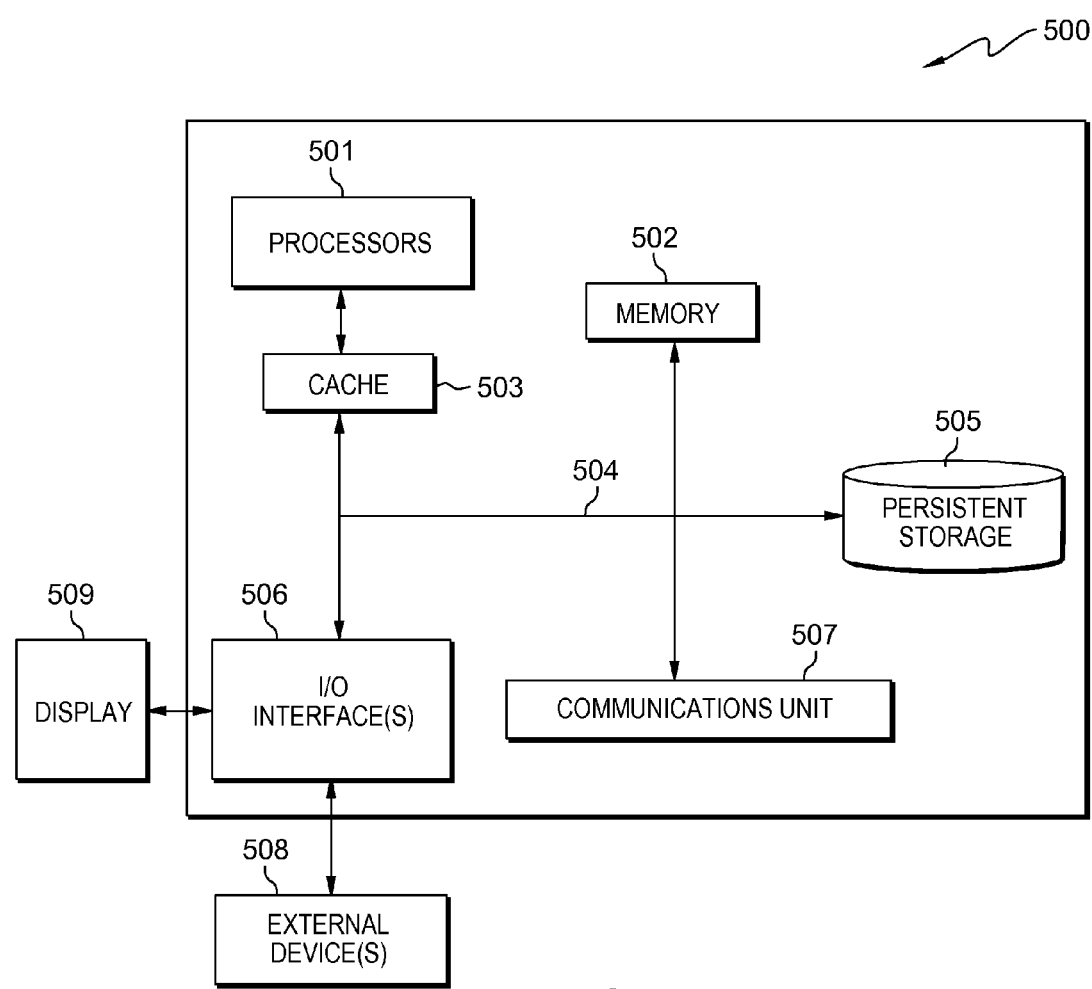
FIG. 5 is a block diagram of components of the client computer of FIG. 1, in accordance with an embodiment of the present invention.

FIG. 5 depicts computer 500, which illustrates components of client computer 110, which includes comment program 112. Computer 500 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 may be implemented with any architecture designed for passing data and/or control information between processors (e.g., microprocessors, communications and network processors), system memory, peripheral devices, and any other hardware components within a system. For example, communications fabric 504 may be implemented with one or more buses or a crossbar switch.

Memory 502 and persistent storage 505 are computer readable storage media. In this embodiment, memory 502 includes random access memory (RAM). In general, memory 502 may include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external devices 508 such as a keyboard, keypad, a touch screen, and/or some other suitable input device. External devices 508 may also include portable computer readable storage media such as, for example, thumb drives, portable optical or magnetic disks, and memory cards. Software and data used to practice embodiments of the present invention may be stored on such portable computer readable storage media and may be loaded onto persistent storage 505 through I/O interface(s) 506. I/O interface(s) 506 also connect to display 509.

Display 509 provides a mechanism to display data to a user and may be, for example, a computer monitor.

The descriptions of the various embodiments of the present invention have been presented for purposes of illustration, but are not intended to be exhaustive or limited to the embodiments disclosed. Modifications and variations of the presented embodiments will be apparent to those of ordinary skill in the art without departing from the scope and spirit of the invention. The terminology used herein was chosen to best explain the principles of the embodiment, to best explain the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for inserting text into a file as a comment in a determined comment convention, the method comprising:
   determining, by one or more computer processors, a comment convention in a file, wherein the file includes at least one file line, and wherein determining a comment convention comprises:
      determining, by one or more computer processors, a start comment sequence; and
      determining, by one or more computer processors, one or more of the following:
   an end comment sequence, a header line, and a trailer line, wherein determining the header line comprises:
      determining, by one or more computer processors, if a first appearance of the start comment sequence and a file line immediately preceding the start comment sequence have a same character in a same character location; and
      responsive to determining the first appearance of the start comment sequence and the file line immediately preceding the start comment sequence have a same character in a same character location, determining, by one or more computer processors, the header line as the file line immediately preceding the start comment sequence;
   receiving, by one or more computer processors, a text content; and
   inserting, by one or more computer processors, a comment into the file, wherein the comment includes the comment convention and the text content.

2. The method of claim 1, wherein determining a start comment sequence comprises:
   determining, by one or more computer processors, at least one file line of the file that has a special character as a first non-space character;
   determining, by one or more computer processors, one or more character sequences in the determined at least one file line; and
   determining, by one or more computer processors, a most frequently identified character sequence of the determined one or more character sequences.

3. The method of claim 1, wherein determining an end comment sequence comprises:
   determining, by one or more computer processors, the end comment sequence as a reverse order of the start comment sequence in a file line in which the start comment sequence is identified.

4. The method of claim 1, wherein determining a trailer line comprises:
   determining, by one or more computer processors, if a last appearance of the start comment sequence and a file line immediately succeeding the start comment sequence have a same character in a same character location; and responsive to determining the last appearance of the start comment sequence and the file line immediately succeeding the start comment sequence have a same character in a same character location, determining, by one or more computer processors, the trailer line as the file line immediately succeeding the start comment sequence.

5. A computer program product for inserting text into a file as a comment in a determined comment convention, the computer program product comprising:
one or more computer readable storage media; and
program instructions stored on the one or more computer readable storage media, the program instructions comprising:
program instructions to determine a comment convention in a file, wherein the file includes at least one file line, and wherein the program instructions to determine a comment convention comprise:
program instructions to determine a start comment sequence; and
program instructions to determine one or more of the following: an end comment sequence, a header line, and a trailer line, wherein program instructions to determine the header line comprise:
program instructions to determine if a first appearance of the start comment sequence and a file line immediately preceding the start comment sequence have a same character in a same character location; and
program instructions to, responsive to determining the first appearance of the start comment sequence and the file line immediately preceding the start comment sequence have a same character in a same character location, determine the header line as the file line immediately preceding the start comment sequence;
program instructions to receive a text content; and
program instructions to insert a comment into the file, wherein the comment includes the comment convention and the text content.

6. The computer program product of claim 5, wherein the program instructions to determine a start comment sequence comprise:
program instructions to determine at least one file line of the file that has a special character as a first non-space character;
program instructions to determine one or more character sequences in the determined at least one file line; and
program instructions to determine a most frequently identified character sequence of the determined one or more character sequences.

7. The computer program product of claim 5, wherein the program instructions to determine an end comment sequence comprise:
program instructions to determine the end comment sequence as a reverse order of the start comment sequence in a file line in which the start comment sequence is identified.

8. The computer program product of claim 5, wherein the program instructions to determine a trailer line comprise:

program instructions to determine if a last appearance of the start comment sequence and a file line immediately succeeding the start comment sequence have a same character in a same character location; and
program instructions to, responsive to determining the last appearance of the start comment sequence and the file line immediately succeeding the start comment sequence have a same character in a same character location, determine the trailer line as the file line immediately succeeding the start comment sequence.

9. A computer system for inserting text into a file as a comment in a determined comment convention, the computer system comprising:
one or more computer processors;
one or more computer readable storage media; and
program instructions, stored on the one or more computer readable storage media for execution by at least one of the one or more computer processors, the program instructions comprising:
program instructions to determine a comment convention in a file, wherein the file includes at least one file line, and wherein the program instructions to determine a comment convention comprise:
program instructions to determine a start comment sequence; and
program instructions to determine one or more of the following: an end comment sequence, a header line, and a trailer line, wherein program instructions to determine the header line comprise:
program instructions to determine if a first appearance of the start comment sequence and a file line immediately preceding the start comment sequence have a same character in a same character location; and
program instructions to, responsive to determining the first appearance of the start comment sequence and the file line immediately preceding the start comment sequence have a same character in a same character location, determine the header line as the file line immediately preceding the start comment sequence;
program instructions to receive a text content; and
program instructions to insert a comment into the file, wherein the comment includes the comment convention and the text content.

10. The computer system of claim 9, wherein the program instructions to determine a start comment sequence comprise:
program instructions to determine at least one file line of the file that has a special character as the first non-space character;
program instructions to determine one or more character sequences in the determined at least one file line; and
program instructions to determine a most frequently identified character sequence of the determined one or more character sequences.

11. The computer system of claim 9, wherein the program instructions to determine an end comment sequence comprise:
program instructions to determine the end comment sequence as the reverse order of the start comment sequence in a file line in which the start comment sequence is identified.

* * * * *